Aug. 11, 1964

R. S. WILKES 3,144,143

SILO UNLOADER

Filed May 29, 1961

*INVENTOR.*
RAYMOND S. WILKES

BY *William A. Murray*

ATTORNEY

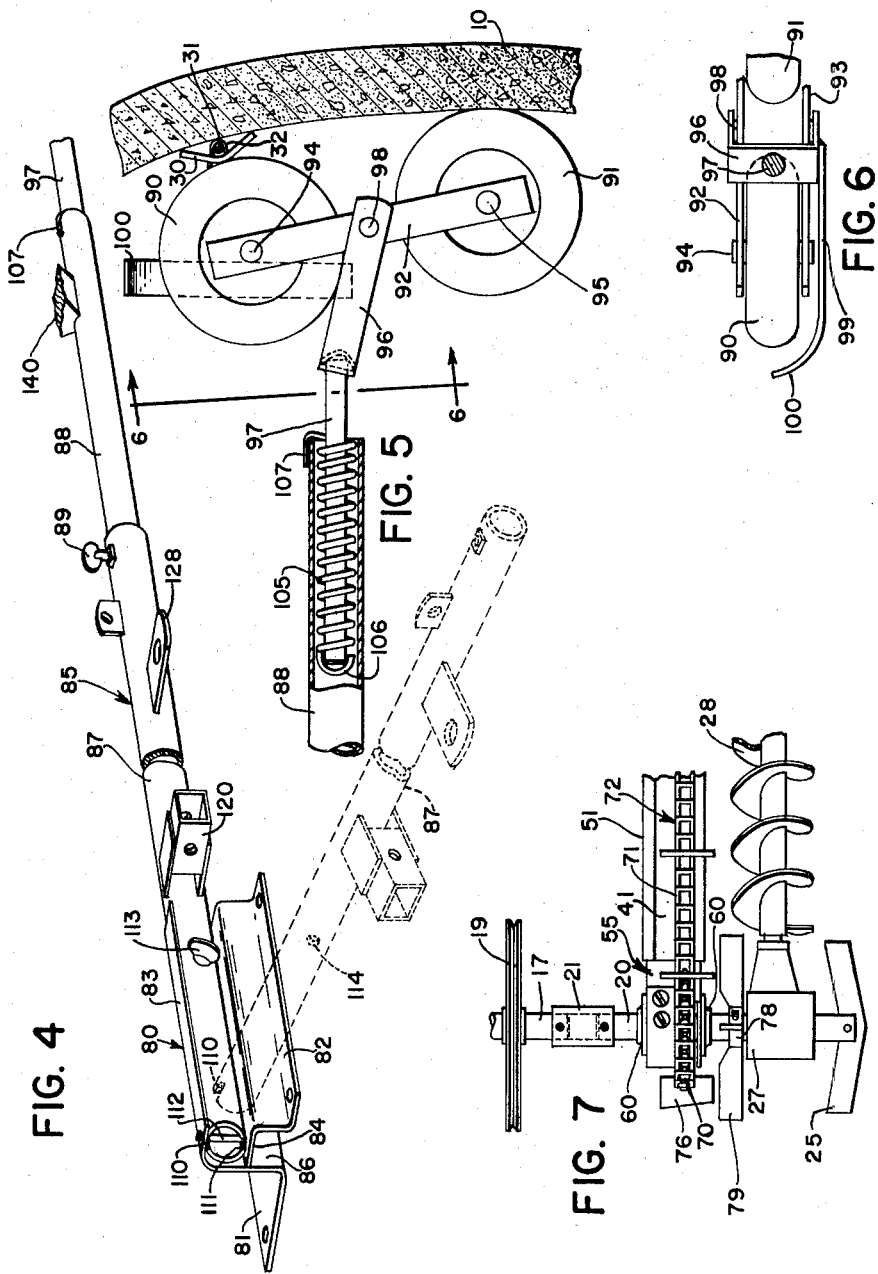

Aug. 11, 1964
R. S. WILKES
3,144,143
SILO UNLOADER
Filed May 29, 1961
3 Sheets-Sheet 3
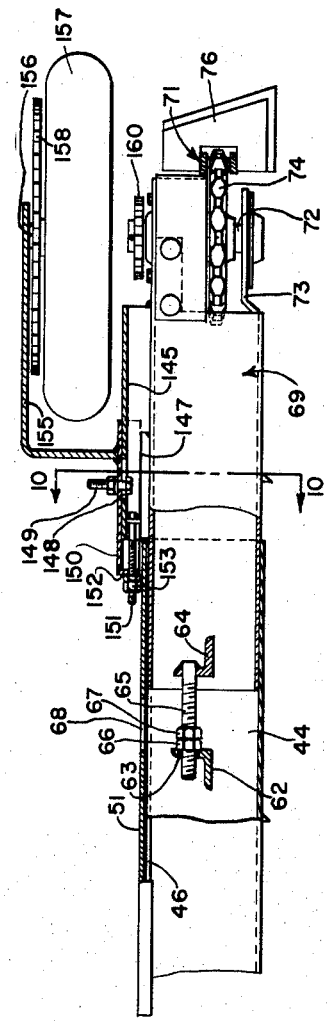
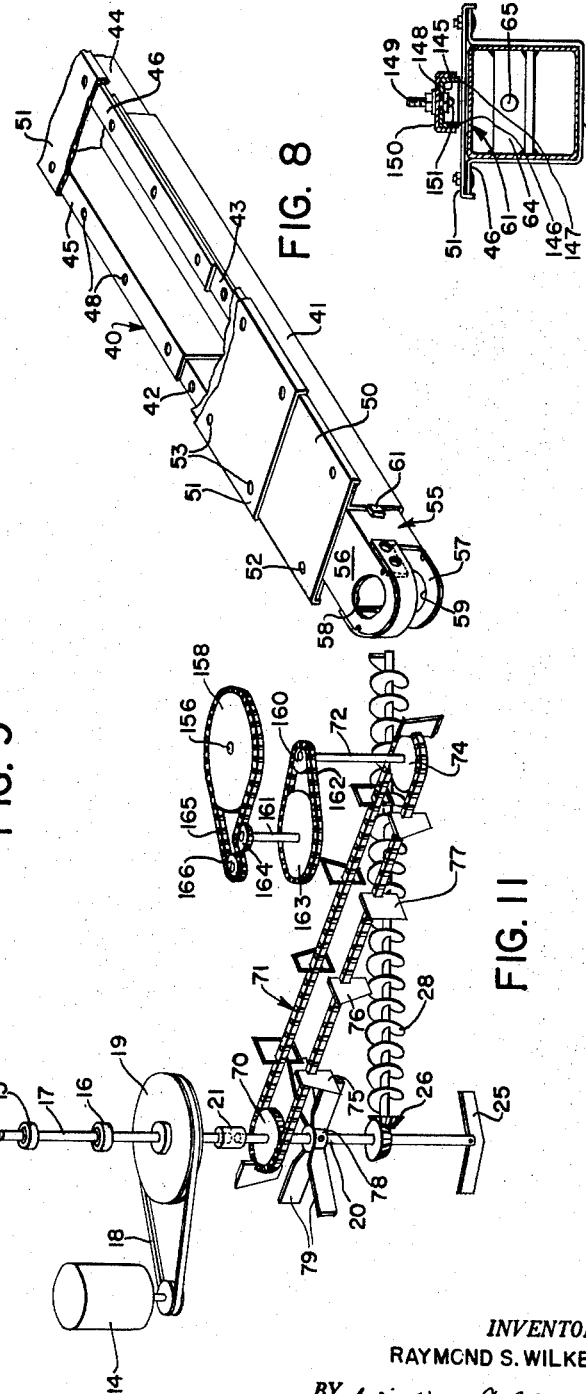
INVENTOR.
RAYMOND S. WILKES
BY William A. Murray
ATTORNEY

United States Patent Office
3,144,143
Patented Aug. 11, 1964

3,144,143
SILO UNLOADER
Raymond S. Wilkes, Moline, Ill., assignor to Deere &
Company, Moline, Ill., a corporation of Delaware
Filed May 29, 1961, Ser. No. 113,265
14 Claims. (Cl. 214—17)

This invention relates to a silo unloader and more particularly to the surface type of silo unloader in which there is provided adjacent the surface of the silage an auger which digs its own trench. Sweep means sweep over the surface of the silage and discharge silage into the auger trench. The auger then moves the material outwardly toward a vertical opening adjacent the silo wall which permits the augered silage to gravitate to the ground level.

It is one of the main objects of the present invention to utilize a wheel drive featuring a horizontal driven wheel in contact with the silo wall and operating to move the sweep means over the silage. The drive wheel is supported on radial structure extending from the center of the silo. Mounted on the radial structure is a radial guide arm extending diametrically opposite to the radial structure and having at its outer end a guide wheel engaging th e silo wall substantially at 180° relative to the main drive wheel. Also, as part of the drive means, there is provided a second radial arm disposed substantially at 90° relative to the radial structure and the first guide arm and having at its outer end a second guide wheel normally not in contact with the silo wall although it is closely adjacent thereto. The purpose of the second guide wheel is to operate as an anchor should the first guide wheel contact an obstruction on the wall which would resist movement of the sweep about the surface of the silage. Should such occur, the second guide wheel will be driven into the wall and as the drive wheel continues to rotate the sweep, the combination of the drive wheel and the second guide wheel will tend to raise the first guide wheel over the obstruction.

It is also an object of the invention to provide a new and unique manner of mounting the radial guide arms on the silo unloader so that they may easily be dismounted when it is desired to mount the unloader in the silo or it is desired to transfer the silo unloader.

It is also an object of the invention to provide a sweep chain on the sweep arm, which in the present instance would be the radial structure carrying the drive wheel having flights thereon. The flights on the chain are formed so that two out of every three flights will cut grooves in the silage and a third flight will sweep the material between the grooves in the silage. This has proven to be a very efficient manner of cutting silage which reduces the overall power required as well as increases the ability of the chain to cut and move the silage.

Other objects and advantages of the present invention will become apparent to those skilled in the art as the nature of the invention is better understood from the following description and as shown in the accompanying drawings.

FIG. 4 is a perspective view of a portion of one of the guide arms.

FIG. 5 is a plan view shown partially in section, of the outer guide wheel structure on one of the guide arms.

FIG. 6 is a sectional view taken substantially along the line 6—6 of FIG. 5.

FIG. 7 is a side view of a central portion of the silo unloader.

FIG. 8 is a perspective view of a portion of the radial sweep structure with portions broken away to show internal construction.

FIG. 9 is a sectional view of the silo unloader taken substantially along the lines 9—9 of FIG. 1.

FIG. 10 is a sectional view taken substantially along the line 10—10 of FIG. 9.

FIG. 11 is a symbolic view representing the drive mechanism for the silo unloader.

Figure 1:
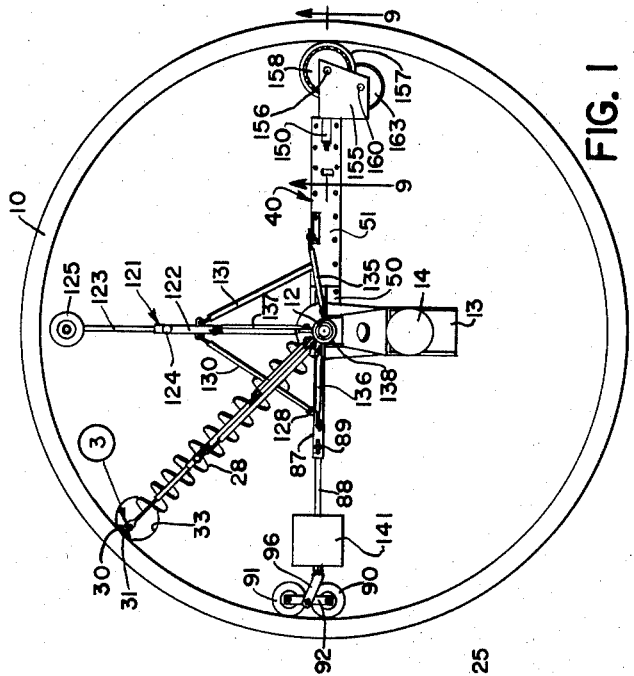
FIG. 1 is a plan view of the silo unloader as placed in a conventional type silo.
Figure 3:
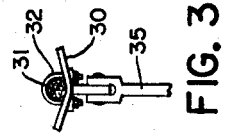
FIG. 3 is an enlarged view of a portion of the silo unloader shown in FIG. 1, and indicated in FIG. 1 by the numeral 3.

The silo unloader is disposed in a conventional type silo as indicated by an upright cylindrical shaped wall 10. The wall 10 may have doors therein, but in the type of silo unloader here to be disclosed, it is preferred that the entire wall 10 be solid. If doors do exist, they will not be removed from the silo.

The silo unloader is suspended from the top of the silo by means of a cable 11 connected to an upright tubular pipe 12. Rigid with the lower end of the pipe 12 is an outwardly projecting lateral platform 13 carrying an electric motor 14, the main and only power source for the silo unloader. Journaled in the pipe 12 by means of bearings 15, 16 (FIG. 11) is an upright drive shaft 17 driven by the motor 14 through a V--belt drive 18 that includes a suitable pulley 19 fixed to the shaft 17. A lower shaft 20 is coupled to the drive shaft 17 at its lower end by a detachable coupling collar 21. The purpose of dividing the vertical drive shaft means into two interconnected shafts 17, 20 is to permit easy removal and replacement of the V-belt 18 and also to permit the silo unloader to be easily dismantled when it is desired to remove the silo unloader from one silo to another or it is desired to initially mount the silo unloader in a silo.

Mounted on the lower end of the lower drive shaft 20 is a digger element 25 which tends to dig the silage from an area directly beneath the shafts 17, 20 and the various transmissions which operate to drive the other parts of the silo unloader. A beveled gear transmission 26, mounted in a gear housing 27 is provided just above the digging element 25 and operates to drive a radially extending auger 28. The auger 28 extends outwardly and has its outer end connected to the lower end of an upright V-shaped cover 30 positioned adjacent the wall 10 of the silo. The V-shaped cover 30 overlies a portion of an upright cable 31 fixed to and disposed adjacent the wall 10 and extending from the upper portion of the silo downwardly to a discharge opening at the base of the silo. The cover 30 is connected to the cable 31 by means of U-shaped bolts 32 extending through the element 30 and behind the cable 31. The bolts are not sufficiently tight to offer frictional resistance to the V-shaped cover 30 moving vertically. The cover 30 has gradually sloping sides extending to opposite sides of the cable 31 so as to minimize the obstruction of the cable as wheels (later to be explained) pass over the cable.

The auger 28 normally lies beneath the surface of the silage and in operation actually digs and maintains its own trench directly beneath the surface. The auger 28 feeds the material into a vertical discharge opening 33, just inwardly of the wall 10, extending the entire height of the silage. The silage driven outwardly by the auger 28 therefore will gravitate in the opening 33 to the lower portion of the silo to be collected and moved into a suitable conveyor or feeding mechanism. Extending from the pipe 12 to the upper end of the cable cover element 30 is a radial arm 35 which prevents rotation of the pipe 12 about its axis. The arm 35 is composed of two telescoping members locked together by a locking bolt 36 so that the arm 35 may be extended. Suitable truss rods 37, 38 extend from the upper portion of the pipe 12 to the radial arm 35.

An adjustable radial structure, indicated in its entirety by the reference numeral 40, extends from the lower drive shaft 20 outwardly to a point adjacent the wall 10. The radial structure includes an inner U-shaped channel 41 having upper outwardly extending flanges 42, 43, and an outer U-shaped channel member 44 with upper outwardly extending flanges 45, 46. Viewing FIG. 8, it becomes apparent the outer channel member 44 has its channel portion adapted for insertion within the channel portion of the inner U-shaped member 41. The overlapping portions of flanges 45, 46 normally lie atop the flanges 42, 43. Consequently the male channel member 44 may be extended and retracted relative to the female channel member 41. There are provided in the flanges 42, 43, 45, 46 a series of radially spaced holes 48 which are registrable with one another. The holes are spaced apart, in the present instance at one foot intervals. Consequently the entire radial structure may be adjusted radially in one foot increments. Mounted atop the inner channel member is a laterally disposed plate 50. Mounted atop the flanges 45, 46 of the outer channel 44 is a plate member 51. The plate 51 overlaps the plate 50 and will in fact overlap substantially the same length that the male channel 44 overlaps or extends into the female channel member 41. Provided in the plates 50, 51 are a series of radially spaced holes 52, 53 respectively, which are spaced on the order of the openings 48 in the respective flanges 42, 43 and 45, 46. Bolts, such as at 54, extend through the aligned holes and normally rigidify the entire structure. When the plates 50, 51 are rigidly mounted the entire structure becomes a rigid box channel. As is clearly evident, the length of the structure is easily adaptable for extension or retraction so that the silo unloader may fit in different size silos. A box-like insert 55 is provided at the inner end of the channel 41. The box-like insert 55 is open at its inner end and has upper and lower plates 56, 57 extending beyond the sides of the box structure 55, the plates 56, 57 having journal openings 58, 59 respectively receiving journal blocks 60. The journal blocks 60 carry the lower drive shaft 20. Provided on the sides of the inner box insert 50 are stop lugs, such as is shown at 61, contacting the inner edges of the male channel 41 and limiting the amount of insertion in the channel 41. Unless otherwise restricted, the box insert 55 may slide out of the channel 41, but is restricted in its inward movement by the blocks 61.

On the outer end of the radial structure 40 is provided a second box-type insert 69 which may be inserted in the outer channel member 44. The sides of the channel 69 are generally continuous with the sides of the channel 44 with the exception, of course, that the sides of the channel 69 are insertable within the sides 44. Extending between the sides of the channel 44 is an angle iron bracket 62 with an opening 63 therein. Extending across the sides of the box channel 69 is an angle iron member 64 having welded thereto a threaded member 65 extending radially inwardly and through the opening 63. Mounted on the threaded member 65 is a pair of nuts 66, 67, the nut 66 abutting against the surface of the angle iron 62 and operating as a stop means for limiting the degree of insertion of the insert 69 in the channel 44. As may be clearly evident by viewing FIG. 9, the exact amount of extension or retraction of the box channel 69 relative to the channel 44 may be accurately set by adjusting the nuts 66, 67 along the threaded member 65. However, the entire box channel 69 may, unless otherwise restricted, be removed from the channel 44 by merely withdrawing the channel 69 from the channel 44. A slot 68 is provided in the plate 51 through which a wrench may extend for adjusting the nuts 66, 67.

Fixed to the drive shaft 20 and between the upper and lower plates 56, 57 of the inner channel box insert 55 is a drive sprocket 70. Mounted over the sprockets 70 is a continuous conveyor chain 71. The outer box channel insert 69 has journaled thereto a sprocket shaft 72, an upper panel of the channel 69 being provided for the upper support of the shaft 72 and an outwardly projecting bracket 73 being provided for the lower support of the shaft 72. The bracket 73 is fixed to the floor panel of the insert 61. Supported on the shaft 72 is a sprocket 74 which receives the outer end of the chain 71. As may be readily apparent from viewing the drawings, one run of the chain lies adjacent one side of the channels 41, 44 and the opposite run of the chain 71 rides adjacent the opposite side of the channels 41, 44. Consequently the channels 41, 44 serve as backing support for the chain runs. Carried on the chain 71 are a plurality of flights or cutting elements 75, 76, 77. The flights 75, 76, 77 have horizontally disposed upper and lower edges and, it will be noted, the cutting flight 75 is provided with an inclined cutting edge extending from a wide lower end to a narrow upper end; the flight 76 is provided with a cutting edge extending from a wide upper end to a narrow lower end and the flight 77 is provided with an upright cutting edge not inclined in either direction. The purpose in so providing the flights is to provide cutting points on the flights 75, 76 which tend to cut upper and lower grooves in the silage as the chain moves therethrough, and the flight 77 will then tend to clear the material between the upper and lower grooves formed by the flights 75, 76.

Also mounted on the shaft 20 between the chain 72 and gear housing 27 is a thrower device composed of a central hub 78 and radial arms 79. As the silage is brought into the center by the chain 72, the arms 79 will contact it and keep clear and prevent clogging of the central area. The arms 79 aid in moving the silage into the auger trench formed by the auger 28.

Supported on the inner end of the radial structure 40 is an arm support 80. The arm support 80 is composed of a pair of panels 81, 82, welded together and formed with upper and lower flanges 83, 84 respectively spaced vertically apart to permit entry of a guide wheel arm 85. The two flanges 83, 84 are joined by a vertical wall portion 86 to provide an outwardly opening groove or slot which receives the inner end of the guide wheel arm 85.

The guide arm 85 is composed of an inner section 87 and an outer section 88 which telescopes into the inner section 87 and may be locked thereto by a nut 89. The two sections 87, 88 may be extended or retracted according to the dimension of the silo.

A pair of guide wheels 90, 91 is carried by mounting structure on the outer end of the guide arm 85. The mounting structure includes upper and lower metal straps 92, 93 interconnected by axle pins 94, 95 on which the wheels 90, 91 are mounted. A yoke 96, having a radially inwardly directed rod portion 97 inserted in the outer end of the arm section 88, is pivotally connected at the midpoint of the straps 92, 93 by means of a pivot pin 98. The rod 97 is relatively free to rotate within the outer end of the section 88 and consequently the entire wheel structure operates more or less as a caster on the guide arm 85.

Due to the direction of rotation of the entire silo unloader, the guide wheels 90, 91 will normally be disposed horizontally with one directly forwardly of the other. However, at times there will tend to be a dipping action of the forward wheel and for this reason there is provided a guide or silage engaging element 99 welded to the underside of the lower leg of the yoke 96 and extending under the forward wheel 90. The end of the strap bar or silage engaging element 99 is curved at 100. Consequently should the wheel structure tend to dip the strap 99 and particularly its end 100 will contact the silage and will tend to guide the wheel structure over the surface of the silage until the force of the drive on the wheels causes the wheels to realign horizontally.

Referring specifically to FIG. 5, the end of the rod 97 is insertable in the outer section 88 of the guide arm 85 and is normally biased outwardly. The rod 97 is inserted in a coil spring 105 having an end coil 106 extending across the section 88 to contact and hold the inner end of the rod 97. The outer end 107 of the spring 105 is curved outwardly to lie outside of the end edge of the section 88. In normal operation the spring 105 is extended by the rod 97 so that there is a pressure between the wall 10 of the silo and the wheels 90, 91.

Figure 2:
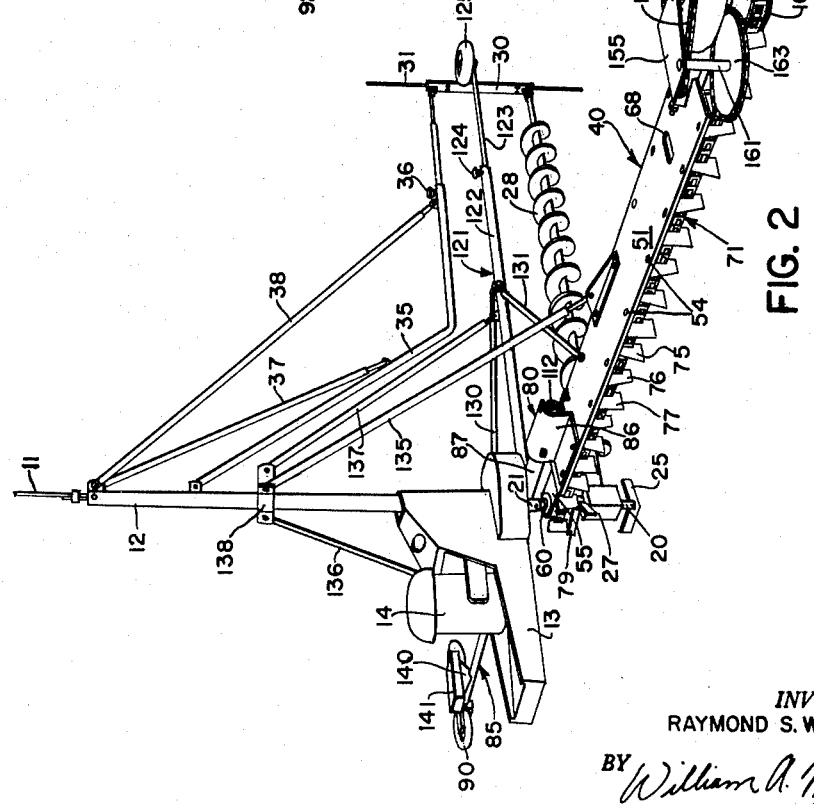
FIG. 2 is a perspective view of the silo unloader.

The inner end of the inner arm section 87 is provided with a pair of notches 110, 111 opening to the edge of the section 87. Extending between the ends of the flanges 83, 84 is a rigid stud 112 normally receiving the notched end of the arm section 87. At the opposite end of the arm support 80 and provided in the vertical wall panel 86 is a bolt opening, not shown, but clearly evident by the location of a bolt 113. The section 87 is provided with openings 114 registrable with the aforementioned hole in the vertical panel 86. In mounting the entire arm 85, it is merely necessary to place the notches 110 and 111 against the stud 112 and to swing the arm 85 about the stud 112 until it is completely inserted between the flanges 83, 84. The bolt 113 may then be inserted and the arm 85 is locked into position relative to the arm support 81. As is clearly evident from viewing FIGURES 1 and 2, the normal position of the guide arm 85 is substantially on a diametrical extension of the radial structure 40. In this matter the pressure applied by the spring 105 on the respective wheels 90, 91 also extends across the radial structure and will be resisted by the pressure of the radial structure or attachments thereon which contact the opposite portion of the wall 10.

An arm socket 120 is welded to one surface of the arm section 87. The socket 120 normally receives a second guide arm 121 having an inner section 122 and a telescoping outer section 123. The two sections 122, 123 may be extended or retracted relative to one another and may be locked together by means of a bolt 124. The outer end of the section 123 supports the horizontally disposed wheel 125. The normal operation of the wheel 125 is disposed inwardly of the wall 10 and will contact the wall only upon occasion. The bracket 128 is welded to the outer end of the first arm section 87. A tie or truss rod 130 extends from the bracket 128 to a portion of the arm section 122. Similarly a tie rod 131 may be connected to one of the bolts 54 on the radial section 40 and extend outwardly to an outer portion of the arm 122. The tie rods 130, 131 tie the radial structure 40, the guide arm 85, and the second guide arm 121 rigidly against angular movement relative to one another. In this respect, there are provided three truss or tie rods 135, 136 and 137 extending downwardly from a supporting bracket 138 on the main pipe support 12 to the radial structure 40, the inner section 87 and the inner section 122 respectively. The latter tie or truss rods support the portions vertically.

Also incidental to proper operation of the silo unloader is a weight platform 140 carried on the outer end of the outer arm section 88 which carries weights 141 for proper balancing of weight distribution on the silo unloader.

Referring now to FIGURES 9 and 10, the square sectioned insert 69 has welded to its upper surface an inverted U-shaped channel 145 serving as a track or guide for a drive wheel structure, presently to be described. The channel 145 has a pair of longitudinally extending slots 146, 147 accommodating the outer edge or end of the top panel 51 to permit adjustment of the insert section 61 relative to the channel section 44. An upper slot 148 is provided in the upper surface of the channel tract 145. Overlying the U-shaped channel track 145 is a second U-shaped member 150 capable, unless otherwise restricted, of sliding longitudinally over the lower channel track 145. Adjustment of the overlying channel 150 relative to the lower channel 145 is provided by a stud 151 fixed to the lower track 145 and extending through an end plate 152 rigid with the upper channel 150. A pair of adjusting nuts 153 is provided to regulate the distance of overhang of the upper channel 150 relative to the lower track 145. A lock bolt 149 extends through the channel 150 and slot 148 and effects a locking relation between the channels 145, 150.

Fixed to the upper surface of the upper channel 150 is an overhang plate structure 155 extending first upwardly from the surface and then radially outwardly and supporting at its outer end a stub shaft 156. Carried on the shaft 156 is the main drive wheel 157 for the silo unloader and a drive sprocket 158. As will be noted from viewing FIG. 9, the outer periphery of the drive wheel 157 extends considerably beyond the outer periphery of the sprocket 158.

Referring to FIG. 11, the power for the drive wheel 157 is received from the shaft 72 which in turn is rotated by the sprocket 74 through the sweep chain 71. At the upper end of the shaft 72 is a pinion sprocket 160 driving a counter shaft 161 by means of a chain 162 and a drive sprocket 163 supported on the lower end of the counter shaft 161. The upper end of the counter shaft 161 has keyed thereto a pinion 164 driving the drive wheel sprocket 158 by means of a chain 165. An idler sprocket 166 is provided for takeup in the chain 165 and for effecting rotation of the drive wheel 157.

One of the distinct advantages of the present structure over previous structures is that the present structure may be easily dismantled. For example, if it is desired to dismantle the radial structure 40, by merely removing one link of the chain 71, both inserts 55 and 69 may be withdrawn. The guide arms 85 and 121 may be easily detached by removing the bolts 113 and withdrawing the arm 121 from its socket 120. The truss members 37, 38, 135, 136, 137 are simply attached and may simply be detached from the remainder of the silo unloader. By disengaging the coupling 21 from the shafts 17 or 20, the lower portion of the silo unloader may be dismantled from the drive portion of the silo unloader. Consequently in mounting the silo unloader in the silo, parts may be brought to the surface of the silage individually. Should maintenance be required on the silo unloader while it is in the silo, any part or portion of the silo unloader may be removed without dismantling the entire unloader or without the necessity of removing the entire silo unloader from the silo.

The silo unloader will operate in the following manner. The sweep chain 71 is driven over the surface of the silage by the drive wheel 157 coming in contact with the wall 10 of the silo. The sweep chain draws the silage into the center of the silo where it is picked up by the auger 28 positioned in a trench beneath the surface of the silage. From there the silage is discharged into the vertical opening 33 at the side of the silo. Since there is normally different types of obstructions in the wall of the silo, one being the V-shaped cable cover 30, the guide wheels 90, 92 will often times tend to stop or be held against further movement. The purpose of the additional guide wheel 125 is to permit guide wheels 90, 92 to be raised over the obstruction 30. This will occur due to the fact that the drive wheel 157 will continue driving even though the guide wheels 90, 92 may be held against rotation by the wall obstruction. As the drive wheel continues driving the second guide wheel 125 will come in contact with the wall 10. This will cause the guide wheels 90, 91 to be slightly raised, or to relax some of the tension in the spring 105 so that the continued movement of the drive wheel 157 will cause the wheels 90, 91 to move over the obstruction. It should also be noted that the purpose of having two guide wheels 90, 91 is to reduce the effect of the spring pressure 105 as respects the guide wheels 90, 91 and the adjacent wall 10. By providing the two guide wheels to be pivoted to the yoke 96 at a point midway between the guide wheels, the pressure of the spring is distributed substantially 50% on each wheel. This makes it easier for the wheel 90, or the wheel 91 to move over the obstruction 30. Since the main purpose of the spring pressure is to maintain pressure between the drive wheel 157 and the wall 10, the type of mounting and the number of drive wheels 90, 91 would have no bearing upon the effective drive pressure.

While only one form of the invention has been shown, it should be recognized that other forms and variations will occur to those skilled in the art. Therefore, it should be understood that the present disclosure was shown in detailed manner for the purpose of clearly and concisely illustrating the principles of the invention and it was not intended to limit or narrow the invention beyond the broad concepts set forth in the appended claims.

What is claimed is:

1. A silo unloader comprising: a central upright drive shaft; an auger disposed in a trench beneath the level of the silage and connected to said drive shaft; radial structure extending between the drive shaft and the silo wall; a horizontal drive wheel supported on the outer end of the radial structure engaging the silo wall; drive means between the central shaft and wheel for driving the latter; sweep mechanism on said radial structure effective to sweep over the silage and move silage into the trench; a first guide arm extending radially from the center of the silo; means mounting the inner end of the guide arm on the radial structure whereby the guide arm and radial structure are disposed diametrically across the silo; a guide wheel mounted on the outer end of the guide arm; means on the guide arm biasing the guide wheel into engagement with the wall and for maintaining pressure on the drive wheel and guide wheel relative to the wall; a second guide arm connected to and extending substantially at right angles to the first guide arm and radial structure and disposed in front of the drive wheel and behind the first guide wheel; a second guide wheel supported on the outer end of the second guide arm closely but spacedly adjacent the silo wall and effective to contact the wall upon said first guide wheel contacting a wall obstruction which temporarily prevents passage of the first guide wheel.

2. On a silo unloader, a central upright drive shaft; radial structure extending between the drive shaft and the silo wall; a horizontal drive wheel supported on the outer end of the radial structure engaging the silo wall; drive means between the central shaft and wheel for driving the latter and the radial structure about the surface of the silage; a first arm extending radially from the center of the silo; means mounting the inner end of the arm on the radial structure whereby the arm and radial structure are disposed diametrically across the silo; a pressure wheel mounted on the outer end of the arm; means on the arm biasing the wheel into engagement with the wall and for maintaining pressure by the drive wheel and pressure wheel relative to the wall; a second arm connected to and extending substantially at right angles to the first arm and radial structure and disposed in front of the drive wheel and behind the pressure wheel; an idler wheel supported on the outer end of the second arm closely but spacedly adjacent the silo wall and effective to contact the wall upon said pressure wheel contacting a wall obstruction which temporarily prevents movement of the pressure wheel.

3. A silo unloader comprising: a central upright drive shaft, radial structure extending between the drive shaft and the silo wall; a horizontal drive wheel supported on the outer end of the radial structure engaging the silo wall; drive means between the central shaft and wheel for driving the latter; a radial guide arm; means mounting the inner end of the guide arm on the radial structure whereby the guide arm and radial structure are disposed substantially diametrically across the silo; a guide wheel; castor structure mounting the guide wheel on the outer end of the guide arm whereby said wheel may swivel about a horizontal axis substantially on a radius of the silo; a rigid silage engaging element supported on the castor structure beneath the guide wheel adapted to ride over the surface of the silage and for limiting downward tilting of the guide wheel; and means on the guide arm for maintaining the wheel in engagement with the wall.

4. The invention defined in claim 3 in which the rigid silage engaging element is a rigid strap generally underlying the guide wheel with an outer end in advance of the wheel turned upwardly.

5. A silo unloader comprising: a central upright drive shaft, radial structure extending between the drive shaft and the silo wall; a horizontal drive wheel supported on the outer end of the radial structure engaging the silo wall; drive means between the central shaft and wheel for driving the latter; radial guide arm; means mounting the inner end of the guide arm on the radial structure whereby the guide arm and radial structure are disposed substantially diametrically across the silo; a pair of guide wheels diametrically opposite to the drive wheel with one in advance of the other; rigid structure interconnecting the wheels and including a vertical pivot between the wheels; means on the outer end of the guide arm connected to the vertical pivot; and means on the guide arm for biasing the wheels into engagement with the wall.

6. The invention defined in claim 5 in which the vertical pivot is substantially midway between the two wheels and the means maintaining the wheels in engagement with the wall is a spring biasing the vertical pivot radially outwardly.

7. In a silo unloader, a central upright drive shaft; radial structure extending between the drive shaft and the silo wall; a horizontal drive wheel supported on the outer end of the radial structure engaging the silo wall; drive means between the central shaft and wheel for driving the latter; a radial guide arm having a notch at its inner end; a rigid pivot element mounted on the radial structure for receiving the notch and for permitting the arm to be fulcrumed about the pivot; a lock element supported on the radial structure engaging the arm and for rigidifying the radial structure and arm whereby the guide arm and radial structure are disposed diametrically across the silo; a guide wheel mounted on the outer end of the guide arm; and means on the guide arm biasing the wheel into engagement with the wall and for maintaining pressure on the drive wheel and guide wheel relative to the wall.

8. A silo unloader comprising: a central upright drive shaft; an auger disposed in a trench beneath the level of the silage and connected to drive shaft, radial structure extending between the drive shaft and the silo wall; a horizontal drive wheel supported on the outer end of the radial structure engaging the silo wall; chain sprockets supported on vertical axes on the inner and outer end of the radial structure, the inner sprocket being mounted on the drive shaft a continuous chain mounted over the sprockets; vertical sweep flights on the chain extending laterally therefrom and effective to sweep over the silage and move silage into the trench, said flights being longitudinally spaced along the chain and having upper and lower horizontally disposed edges and vertically disposed cutting edges extending between the horizontal edges with part of said cutting edges being inclined in one direction to define an outwardly projecting cutting point at the upper edge, another part being inclined in the opposite direction to define an outwardly projecting cutting point at the lower edge, and still another part being substantially directly vertical; a guide arm extending radially from the center of the silo; means mounting the inner end of the guide arm on the radial structure whereby the guide arm and radial structure are disposed diametrically across the silo; a guide wheel mounted on the outer end of the guide arm; means on the guide arm biasing the wheel into engagement with the wall and for maintaining pressure on the drive wheel and guide wheel relative to the wall.

9. A silo unloader comprising: an upright guide element fixed to and lying adjacent the silo wall; a central upright drive shaft, an auger disposed in a trench beneath the level of the silage and connected to said drive shaft and having an outer end connected to the guide element; radial structure extending between the drive shaft and the silo wall; a horizontal drive wheel supported on the outer end of the radial structure engaging the silo wall; drive means between the central shaft and wheel for driving the latter; a guide arm extending radially from the center of the silo; means mounting the guide arm on the radial structure whereby the guide arm and radial structure are disposed diametrically across the silo; a guide wheel mounted on the outer end of the guide arm; means on the guide arm biasing the wheel into engagement with the wall and for maintaining pressure on the drive wheel and guide wheel relative to the wall and a vertically disposed cover supported on the guide element and positioned generally in the path of the drive and guide wheels, said cover having gradual sloping sides to opposite sides of the guide element for minimizing the obstructional effect of the guide element as the wheels move over the element.

10. A silo unloader comprising: a central upright drive shaft, an auger disposed in a trench beneath the level of the silage and connected to said drive shaft; radial structure extending between the drive shaft and the silo wall including male and female U-shaped channels disposed in telescoping relation with one another and having laterally extending overlapping flanges, and laterally extending panel means overlying the channels and connected to the flanges for rigidifying the structure and defining with the channels rectangular shaped openings at opposite ends of the structure and adjacent the center of the silo and silo wall respectively; rectangular shaped inserts slidably insertable in the openings; stop means on the inserts limiting the amount of insertion within the openings; a drive sprocket supported on the insert adjacent the center of the silo and connected to the central drive shaft; a chain sprocket supported on the insert adjacent the silo wall; a continuous conveyor chain mounted over the sprockets and having opposite runs on opposite sides of the U-shaped channels, whereby said channels will supply backing support for the runs and the laterally disposed flanges will overlie the runs; flight means on the chain and extending outwardly therefrom for cutting and conveying silage; a horizontal drive wheel supported on the outer end of the radial structure engaging the silo wall; and drive means between the chain sprocket and wheel for driving the latter.

11. A silo unloader comprising: a central upright drive shaft, an auger disposed in a trench beneath the level of the silage and connected to said drive shaft; radial structure extending between the drive shaft and the silo wall including male and female box channels disposed in telescoping relation with one another and having laterally extending overlapping flanges, the channels having rectangular shaped openings at opposite ends of the structure and adjacent the center of the silo and silo wall respectively; rectangular shaped inserts slidably insertable in the openings; stop means on the inserts limiting the amount of insertion within the openings; a drive sprocket supported on the insert adjacent the center of the silo and connected to the central drive shaft; a chain sprocket supported on the insert adjacent the silo wall; a continuous conveyor chain mounted over the sprockets and having opposite runs on opposite sides of the U-shaped channels, whereby said channels will supply backing support for the runs and the laterally disposed flanges will overlie the runs; flight means on the chain and extending outwardly therefrom for cutting and conveying silage; a horizontal drive wheel supported on the outer end of the radial structure engaging the silo wall; and drive means between the chain sprocket and wheel for driving the latter.

12. On a surface silo unloader, a central upright drive shaft; an auger disposed in a trench beneath the surface of the silage; a drive connection between the drive shaft and the auger; radial structure mounted on the driveshaft above the auger extending between the drive shaft and the silo wall; a horizontal drive wheel supported on the outer end of the radial structure engaging the silo wall; drive means between the central shaft and wheel for driving the latter and the radial structure about the surface of the silage; sweep mechanism on said radial structure effective to sweep over the silage and move silage into the trench; an upper rotor including a hub and a radial arm mounted on the shaft between the drive connection and the radial structure for maintaining the area above the drive connection relatively clear of silage; and a lower rotor including a hub and radial arm mounted on the shaft beneath the drive connection for digging silage beneath the drive connection.

13. On a silo unloader, a central upright drive shaft; an auger disposed in a trench beneath the level of the silage; a drive connection between the drive shaft and the auger; radial structure mounted on the drive shaft above the auger extending between the drive shaft and the silo wall; sweep mechanism on said radial structure effective to sweep over the silage and move silage into the trench; an upper rotor including a hub and a radial arm mounted on the shaft between the drive connection and the radial structure for maintaining the area above the drive connection relatively clear of silage; and a lower rotor including a hub and radial arm mounted on the shaft beneath the drive connection for digging silage beneath the drive connection.

14. On a surface silo unloader, a central main drive means; an auger disposed in a trench disposed in and opening to the surface of the material and extending from an inner end adjacent the center of the silo to an outer end adjacent the wall of the silo; a drive connection between the drive means and the auger for effecting movement of material radially outwardly; radial structure above the surface of the silage extending from an inner end adjacent the center of the silo to an outer end; a horizontal drive wheel supported on the outer end of the structure engaging the silo wall; wheel drive means between the central drive means and the wheel for driving the latter and the radial structure about the surface of the material; sweep mechanism on the radial structure offset vertically above the auger and effective to sweep over the material and move material radially inwardly; a rotor structure including laterally extending radial arm means at the center of the silo connected to the drive means and disposed beneath the inner end of the sweep mechanism and above the inner end of the auger, said rotor structure being adapted to receive material from the sweep mechanism and to deposit the material in the trench.

References Cited in the file of this patent

UNITED STATES PATENTS

| | | |
|---|---|---|
| 1,906,395 | Meeks | May 2, 1933 |
| 2,445,056 | Cordis | July 13, 1948 |
| 2,677,474 | Long et al. | May 4, 1954 |
| 2,718,970 | Dueringer | Sept. 17, 1955 |
| 2,955,719 | Hilderbrand | Oct. 11, 1960 |
| 2,963,327 | Seymour et al. | Dec. 6, 1960 |
| 2,995,260 | McCann et al. | Aug. 8, 1961 |
| 3,023,917 | Patz et al. | Mar. 6, 1962 |
| 3,071,263 | Bruecker | Jan. 1, 1963 |